US006929816B2

(12) United States Patent
Wester

(10) Patent No.: US 6,929,816 B2
(45) Date of Patent: Aug. 16, 2005

(54) FAT COMPOSITIONS FOR USE IN FOOD

(75) Inventor: Ingmar Wester, Raisio (FI)

(73) Assignee: Raisio Benecol Ltd., Raisio (FI)

(*) Notice: Subject to any disclaimer, the term of this patent is extended or adjusted under 35 U.S.C. 154(b) by 209 days.

(21) Appl. No.: 10/368,460

(22) Filed: Feb. 20, 2003

(65) Prior Publication Data

US 2003/0175402 A1 Sep. 18, 2003

Related U.S. Application Data

(63) Continuation of application No. 10/084,508, filed on Feb. 28, 2002, now abandoned, which is a continuation of application No. 09/612,198, filed on Jul. 7, 2000, now abandoned, which is a division of application No. 09/064,196, filed on Apr. 22, 1998, now Pat. No. 6,162,483, which is a continuation-in-part of application No. 09/010,211, filed on Jan. 21, 1998, now abandoned.

(51) Int. Cl.$^7$ .............................................. A23D 9/007
(52) U.S. Cl. ..................... 426/607; 426/601; 426/611; 552/544
(58) Field of Search ................................ 426/607, 601, 426/611; 552/544

(56) References Cited

U.S. PATENT DOCUMENTS

| | | | |
|---|---|---|---|
| 3,004,043 A | | 10/1961 | Stern |
| 3,600,186 A | | 8/1971 | Mattison et al. |
| 3,751,569 A | | 8/1973 | Erickson et al. |
| 3,865,939 A | | 2/1975 | Jandacek |
| 3,954,976 A | | 5/1976 | Mattson et al. |
| 4,005,196 A | | 1/1977 | Jandacek et al. |
| 4,034,083 A | | 7/1977 | Mattson |
| 4,160,850 A | | 7/1979 | Hallstrom et al. |
| 4,508,746 A | | 4/1985 | Hamm |
| 5,244,887 A | | 9/1993 | Straub |
| 5,270,041 A | | 12/1993 | Eugster et al. |
| 5,354,573 A | | 10/1994 | Gross et al. |
| 5,502,045 A | * | 3/1996 | Miettinin |
| 5,958,913 A | | 9/1999 | Miettenen |
| 6,162,483 A | * | 12/2000 | Wester |
| 6,492,538 B1 | | 12/2002 | van Amerongen et al. |

FOREIGN PATENT DOCUMENTS

| | | |
|---|---|---|
| CA | 567202 | 12/1958 |
| DE | 2035069 | 1/1971 |
| DE | 2248921 | 4/1974 |
| EP | 195311 | 9/1986 |
| EP | 289636 | 11/1988 |
| EP | 0289636 | 11/1988 |
| EP | 0 911 385 A1 | 4/1999 |
| GB | 1 405 346 | 9/1975 |
| GB | 1 413 102 | 11/1975 |
| JP | 44-4974 | 2/1944 |
| JP | 44-4974 | 2/1969 |
| WO | WO 92/19640 | 11/1992 |
| WO | WO 92/19640 | 12/1992 |
| WO | WO 96/38047 | 12/1996 |
| WO | WO 97/42830 | 11/1997 |
| WO | WO 98/06405 | 2/1998 |
| ZA | 9 607 616 | 5/1997 |

OTHER PUBLICATIONS

*Circulation*, vol. 7, pp. 702–706, (May 1953), O. Pollak "Reduction of Blood Cholesterol in Man".
*Pric. Soc. Exp. Biol Med.*, vol. 78, pp. 143–147, (1951), D. Peterson "Effect of Soybean Sterols in the Diet on Plasma and Liver Cholesterol in Chicks".
*Circulation*, vol. 7, pp. 696–701, (May 1953), O. Pollak "Successful Prevention of Experimental Hypercholesteremia and Cholesterol Atherosclerosis in the Rabbit".
*Circulation*, vol. 17, pp. 890–899, (May 1958), J. Farquhar, et al. "Response of Serum Lipids and Lipoproteins of Man to Beta–Silosterol and Safflower Oil".
*Journal of Lipid Research*, vol. 10, pp. 304–315, (1969), S. Grundy, et al. "The Interaction of Cholesterol Absorption and Cholesterol Synthesis in Man".
*Deutsche Medizinische Wochenschrift*, vol. 101, pp. 1308–1311, (Sep. 1976), P. Oster, et al. "Silosienn be Familiarer Hyperipoproteinänie Typ II".
*Atherosclerosis*, vol. 28, pp. 325–338, (1977), A. Lees, et al. "Plant Sterols as Cholesterol–Lowering Agents: Clinical Trials in Patients with Hypercholesterolemia and Studies of Sterol Balance".
*Münch, Medizinische Wochenschrift*, vol. 120, pp. 1575–1578, (1969), W. Schwartzikopff, et al. "Dosiswurkssmket von β–Silostenn bei Hypercholesterinaminer der Typen lia und lib".
*The American Journal of Clinical Nutrition*, vol. 43, pp. 92–97, (Jan. 1986), R. Tilvis, et al. "Serum Plant Sterols and Their Relation to Cholesterol Absorption".
*American Journal of Epidermitology*, vol. 131, No. 1, pp. 20–31, (1990), T. Meltinen, et al. "Serum Plant Sterols and Cholesterol Precursors Reflect Cholesterol Absorption and Synthesis in Volunteers of a Randomly Selected Male Population".

(Continued)

Primary Examiner—Carolyn Paden
(74) Attorney, Agent, or Firm—ArentFox

(57) ABSTRACT

Fatty acid esters, such as the unsaturated fatty acid esters of sterols and/or stanols, are used as a replacement for a substantial portion or all of the undesirable saturated and trans-unsaturated fats used as structure giving hardstocks in edible foods such as margarines, mayonnaise, cooking oils, cheeses, butter and shortening. Because of the similarity in the crystallinity and physical properties of the esters to those of the undesirable hardstock fats, the substitution or replacement contributes favorably to the flavor, texture and other sensory properties of the foods. Only the fatty acid portion of the phytosterol esters defined herein as texturizing agent is digested or absorbed with the sterol part being unabsorbable, thereby resulting in a reduction in total caloric uptake. Furthermore, the phytosterol fatty acid esters reduce the absorption of both dietary and biliary cholesterol from the digestive tract, thereby lowering the blood serum cholesterol level, especially the LDL-cholesterol.

49 Claims, No Drawings

OTHER PUBLICATIONS

*Scand. Journal. Clin. Lab. Invest.*, vol. 48, pp. 715–722, (1988), M. Färkkllä, et al. "Regulation of Plasma Plant Sterol Levels in Patients with Gut Resections".

*Lipoprotein Metabolism*, pp. 112–118, (1976), (Ed. H. Graten Berlin, Heidelberg, New York; Springer–Vertag), S. Grundy, et al. "Effects of Low Dose Phytosterols on Cholesterol Absorption in Man".

*Atherosclerosis*, vol. 23, pp. 239–248, (1976,) B. Kudchadkar, et al. "Effects of Plant Sterols on Cholesterol Metabolism in Man".

*Journal of Lipid Research*, vol. 29, pp. 1573–1582, (1988), I. Ikeda, et al. "Inhibition of Cholesterol Absorption in Rats by Plant Sterols".

*Journal of Lipid Research*, vol. 29, pp. 1583–1591, (1988), I. Ikeda, et al. "Discrimination Between Cholesterol and Silosterol for Absorption in Rats".

*J. Nutr. Sci. Vitaminol*, vol. 35, pp. 361–369, (1989), I. Ikeda, et al. "Effects of Silostarol and on Silostanol micellar Solubility of Cholesterol".

*Atherosclerosis*, vol. 30, pp. 227–237, (1978), I. Ikeda, et al. Comparison of Absorption and metabolism of β–Silosterol and βSilostanol in Rats.

*J. Nutr.*, vol. 107, pp. 2011–2019, (1977), M. Sugano, et al. A Comparison of Hypocholesteremic Activity of β–Silosterol and β–Silostanol in Rats.

*Atherosclerosis*, vol. 61, pp. 219–223, (1988), T. Heinermann, et al. "Effect of Low–Dose Silostanol on Serum Cholesterol in Patients with Hypercholesterolemia".

*Lipoprotein Metabolism*, pp. 119–124, (1976), (Ed. H. Greten, Berlin, Heidelberg, New York: Springer–Verlag), R. Lees, et al. "Effects of Silostanol Therapy on Plasma Lipid and Upoprotein Concentrations".

*J. Nutr.*, vol. 107, pp. 1139–1146, (1977), F. Mattson, et al. "Effect of Plant Sterol Esters on the Absorption of Dietary Cholesterol".

*Agents Actions (Suppl. 1)*, vol. 26, pp. 117–122, (1986), T. Heinemann, et al. "Comparison of Silosterol and Silostanol on Inhibition of Intestinal Cholesterol Absorption".

*Journal of American Oil Chemists' Society*, vol. 54, pp. 47–50, (1977), D. Chobanov, et al. "Alterations in Glycende Composition During Interesterification of Mixtures of Sunflower Oil with Lard and Tallow".

"Thermodynamic and Molecular Determinants of Sterol Solubilities in Bile Salt Micelles", vol. 26, pp. 1144–1165, (1987), M. Armstrong, et al.

*Pediatric Pharmacology and Therapeutics*, vol. 122, No. 2, pp. 292–296, (1993), M. Becker, MD., et al. "Treatment of Severe Familial Hypercholesterolemia in Childhood with Silosterol and Silostanol".

*Margarine and Shortening Oils by Interesterifation of Liquid and Trisaturated Triglycerides*, List et al. JAOCS 72(3)379–382.

*Chemical Abstracts*, vol. 115, No. 1, (1991), T. Heinemann, et al. Mechanisms of Action of Plant Sterols on Inhibition of Cholesterol Asorption: "Comparison of Silosterol and Silostanol" Chem Abstracts vol. 115(1)5527 1991.

*Chemical Abstracts*, vol. 112, No. 7, (1990), I. Ikeda, et al. "Effects of Silosterol and Silostanol and Micellar Solubility of Cholesterol" Chem Abstracts vol. 112(7) 1990.

*Chemical Abstracts*, vol. 112, No. 7, (1990), I. Ikeda, et al. "Antihypercholesterolemic Activity of β–Silostanol in Rabbits" vol. 112(7) 527983.

*Chemical Abstracts*, vol. 95, No. 13, (1991), I. Ikeda, et al. "Arithypercholesterolemic Activity of β–Silostanol in Rabbits".

*Chemical Abstract*, vol. 88, No. 3, (1978), M. Sugano, et al. "A Companson of Hypocholesterolemic Activity of β–Silosterol andβ–Silostanol in Rats".

*Chemical Abstracts*, vol. 71, No. 1, (1969), T. Tsuchiya "Silosterol Fatty Acid Ester".

Mattson et al., "Effect of an aqueous phase on the solubility of cholesterol in an oil phase", J. of Lipid Research, vol. 18, pp. 203–210, 1977.

Studies with stanol fatty acid esters, 5 pages.

Westrate et al., "Plant sterol–enriched margarines and reduction of plasma total–and LDL–cholesterol concentrations in normochelesterolaemic and mildly hypercholesterolaemic subjects", European J. Clin. Nutr., vol. 52, pp. 334–343, 1998.

Opposed patent as filed in Finnish; Title: A substance for lowering high cholesterol level in serum and a method for preparing the same; Inventors: Miettinen et al.

Norm NEN 3428.

Opposition in corresponding Australian Patent Application Ser. No. 736020.

Sugiyama et al., Translation of JP 61–15647 (1986).

Peterson et al., "Dietary Constituents Affecting Plasma and Liver Cholesterol in cholesterol–Fed Chicks", *Journal of Nutrition*, 1953, vol. 50, pp. 191–201.

Kuksis, "Preparation and Certain Physical Properties of Some Plant Steryl Esters", J. Organic Chem., 25: 1209–1219, 1959.

Peterson et al., "Depression of plasma cholesterol in human subjects consuming butter containing soy sterols", Fed. Proc., 1956, vol. 15, p. 569.

Vanhanen et al., "Effects of unsaturated and saturated dietary plant sterols on their serum contents", Clinica Clinica Acta, vol. 205, 1992, pp. 97–107.

Vanhanen et al., "Serum cholesterol, cholesterol precursors, and plant sterols in hypercholesterolemic subjects with different apoE phenotypes during dietary sitostanol ester treatment", Journal of Lipid Research, vol. 34, 1993, pp. 1535–1544.

Page 2 of the Written Opinion of WO 92/19640.

Page 2 of the International Preliminary Examination Report of WO 92/19640.

Declaration by Ilka Etupaitta.

Miettinen, T. et al., "Serum Plant Sterols and Cholesterol Precursors Reflect Cholesterol Absorption and Synthesis in Volunteers of a Randomly Selected Male Population", Am. J. Epidemiol. 1990; 131:20–31.

Parodi, P., "Fate of Dietary Sterols in Hydrogenated Oils and Fats", J. Am. Oil Chem. Soc., vol. 52:345–348, 1975.

Dutta, P. et al., "Saturated Sterols (Stanols) in Unhydrogenated and Hydrogenated Edible Vegetable Oils and in Cereal Lipids", *J. Sci. Food Agric.* 1996; 71:383–391.

Schuhmann, P. et al., "Method for Qualitative and Quantitative Determination of Phytosterols in Vegetable Oils by LC–GC off–line", Mitt. Gebiete Lebensm. Hyg., 1996; vol. 87:708–715.

Hallikainen, M. et al., "Comparison of the effects of plant sterol ester and plant stanol ester–enriched margarines in lowering serum cholesterol concentrations in hypercholesterolaemic subjects on a low–fat diet". European J. of Clinical Nutrition, 2000: 54:715–725.

Plat, J. et al., "Effects of low–fat yougurt with plant stanol esters and of consumption frequency on LDL–cholesterol Levels", Summary of Presentation at 92nd AOCS Annual Meeting and Expo, May 13–16, 2001, Minneapolis, Minnesota, USA.

"Efficacy of spreads enriched with stanol–stearate esters on blood cholesterol levels", Annex I filed with the Opponent's further submissions of Jun. 27, 2000.

Sugano, M. et al., "Stanol Components in Edible Fats and Oils", Sci. Bull. Fac. Agr., Kyushu Univ., 1977, vol. 32:1–15.

Ullmann's Encyclopedia of Industrial Chemistry, vol.: A16:152–153.

Hilros, M. et al., "Elintarvike Tekniikan Perusteel" VAP-K–kustannus, Helsinki, 1990, pp. 236–241, and translation of passage bridging pp. 240–241.

"Hydrogenation of sterol esters. Demonstration of hydrogenation of sterol moiety", Annex II filed with the Opponent's further submission of Jun. 27, 2000.

Patent Abstracts of Japan, Abstract of 09132512.

Kobayshi et al., Translation of JP 57–206336 (1982).

Peterson, D. et al., "Depression of plasma cholesterol in human subjects consuming butter containing soy sterols", Fed. Proc. 1956; 15, p. 569.

Vanhanen, H. et al., "Effects of unsaturated and saturated dietary plant sterols on their serum contents", Clinica Chimica Acta, 1992; 205:97–107.

Vanhanen, H. et al., "Serum cholesterol, cholesterol precursors, and plant sterols in hypercholesterolemic subjects with different apoE phenotypes during dietary sitostanol ester treatment", J. Lipid Res., 1993, 34:1535–1544.

Jandacek, R. et al., "Effect of an aqueous phase on the solubility of cholesterol in an oil phase", J. of Lipid Research, 1977; 18:203–210.

Miettinen, et al., "Reduction of Serum Cholesterol With Sitostanol–Ester Margarine In A Mildly Hypercholesterolemic Population" The New England Journal of Medicine, 333: 1308–1312, Nov. 16, 1995.

Miettinen, et al., "Dietary sitostanol related to absorption, synthesis and serum level of cholesterol in different apolipoprotein E phenotypes", Atherosclerosis 105 (1994) 217–226.

Pollack, "Effect of Plant Sterols on Serum Lipids and Atherosclerosis", Pharmac. Ther. vol. 31, pp. 177–208, 1985.

Mattson, et al, "Effect of Plant Sterol Esters on the Absorption of Dietary Cholesterol", J. Nutr. 107 (1977) 1139–1146.

Mattson et al., "Optimizing the effect of plant sterols on cholesterol absorption in man", The American Journal of Clinical Nutrition, 35: 697–700, 1982.

Vanhanen et al, "Serum levels, absorption efficiency, faecal elimination and synthesis of cholesterol during increasing doses of dietary sitostanol esters in hypercholesterolaemic subjects", Clinical Science, 1994, 87: 61–67.

Raison Tehtaat Oy Ab, Stock Exchange Bulletin 1(2), Jul. 15, 1997.

"A Step Beyond Paralysis—Doctors prove that a spinal cord can repair itself", Time, Aug. 5, 1996.

Ross, "Literature Survey on Plant Sterols and Related Substances", Preliminary Report, 1996.

Ryan, Europe/USA, Trip Report, Oct./Nov. 1996.

Sistostanol Margarines, Background Information.

Guideline Specifications, FOSFA International, Second Edition, Jan. 1994, p. 13.

"Quality of olive oil investigated", Lipid Technology, pp. 3–4, 1996.

"New Review, Raisio success with sitostanol margarine", Lipid Technology, pp. 51–52, 1996.

"Nutrition, Plant Sterols in the diet", Lipid Technology, pp. 114–117, 1996.

European Journal of Clinical Pharmacology, vol. 40 (Suppl.), pp. 559–563, (1991), T. Heinemann, et al. "Mechanisms of Action of Plant Sterols on Inhibition of Cholesterol Absorption".

The American Journal of Clinical Nutrition, vol. 35, pp. 697–700, (1982), F. Mattson, et al. "Optimizing the Effect of Plant Sterols on Cholesterol Absorption in Man".

J. Clin. Invest., vol. 80, pp. 578–581, (Aug. 1987), Y. Kastriami, et al. "Intestinal Cholesterol Absorption Efficiency in Man is Related to Apopritein E Phenotype".

Annals of Clinical Research, vol. 20, pp. 26–31, (1988), Y. Kasardarri, et al. "Metabolic Epidemology of Plasma Cholesteral".

Journal of Lipid Research, vol. 27, pp. 227–235, (1988), C. Ehnholm, et al. "Apohprotein E Polymorphism in the Finnish Population: Gene Frequencies and Relation to Lipprotein Concentrations".

The Lancet, vol. 2, pp. 1261, (Nov. 1988), T. Meltinen, et al. "Serum Cholesterol Response to Dietary Cholestrol. and Apoprotein E Phenotype".

N.Y. Academy of Science, vol. 2, pp. 129–134, (1955), G. Gould Absorbability of Beta–Silosterol.

Metabolism, vol. 18, pp. 652–662, (1969), G. Gould, et al. "Absorbability of Beta–Silosterol in Humans".

The Journal of Clinical Investigation, vol. 49, pp. 952–967, (1970), G. Salen, et al. "Metabolism of β–Silosterol in Man".

Journal of Lipid Research, vol. 26, pp. 203–209, (1985), G. Salen, et al."Increased Plasma Cholesterol and 5α–Saturated Plant Sterol Derivatives in Subjects with Sitosterclemia and Xanthomatosis".

Journal of Lipid Research, vol. 30, pp. 1319–1330, (1989), G. Salen, et al. "Increased Silosterol Absorption, Decreased Removal, and Expanded Body Pools Compensate for Reduced Cholesterol Synthesis in Silosterolemia with Xanthomatosis".

Journal of Lipid Research, vol. 18, pp. 203–210, (1977), R. Jandscek, et al. "Effect of an Aqueous Phase on the Solubility of Cholesterol in an Oil Phase".

Life Sciences, vol. 57, No. 1, pp. 195–206, W.H. Ling, et al. "Dietary Phytosterols: A Review of Metabolism, Benefits and Side Effects".

Bile Acids and Cholesterol In Health and Disease, Falk Symposium 33, pp. 183–187, LA. Miettinen, et al. "NonCholesterol Sterols and Bile Acid Production in Hypercholesterolemic Patients with Heart Bypass".

Artherosclerosis, vol. 105, pp. 217–226, (1994), LA. Miettinen, et al. "Dietary Silostanol Related to Absorption, Synthesis and Serum Level of Cholesterol in Different Apolipoprotein E. Phenotypes".

The New England Journal to Medicine, vol. 333, pp. 1308–1312, (1995), T.A. Miettinen, et al. "Reduction of Serum Cholesterol with Silostand–Ester Margarine in a Mildly Hypercholesterolemic Population".

Pharmac. Ther., vol. 31, pp. 177–206, (185) O.J. Pollak "Effect of Plant Sterols on Serum Lipids and Atherosclerosis".

Atherosclerosis, vol. 24, pp. 301–309 (1976), M. Sugano, et al. "Lipid–Lowering Activity to Phytostanols in Rats".

Clinical Science, vol. 87, pp. 61–67, (1994), H.I. Vanhanen et al. "Serum Levels, Absorption Efficiency, Faecal Elimination and Synthesis of Cholesterol During Increasing Doses of Dietary Silostanol Esters in Hypercholesterolaemic Subjects".

* cited by examiner

FAT COMPOSITIONS FOR USE IN FOOD

This is a Continuation of application Ser. No. 10/084,508, filed Feb. 25, 2002, now abandoned which is a Continuation of application Ser. No. 09/612,198 filed Jul. 7, 2000, now abandoned which is a Divisional of application Ser. No. 09/064,196 filed Apr. 22, 1998, now U.S. Pat. No. 6,162,483, which is a Continuation-In-Part of application Ser. No. 09/010,211, filed Jan. 21, 1998, now abandoned, and PCT Application No. PCT/FI97/000669, filed Nov. 3, 1997, application Ser. No. 09/010,211 being a Continuation of application Ser. No. 08/740,845, filed Nov. 4, 1996, now abandoned. The disclosure of the prior applications are hereby incorporated by reference herein in its entirety.

BACKGROUND OF THE INVENTION

This invention relates to edible food compositions. More particularly, this invention relates to food compositions containing certain fat-like esters having the physical characteristics of, but which are less readily digested or absorbed than harmful triglyceride fats such as saturated fats and trans-unsaturated fats contained in hardstock of prior used fat blends. These fat-like esters are substituted for some part of the hardstock as texturizers in the food.

Fats constitute a substantial portion of the total calories in the human diet. In many individuals, fats contribute as much as 40% of the calories consumed. Fat is an important source of energy and contains essential fatty acids, such as linoleic and linolenic acids. Fat is also a carrier for fat-soluble vitamins and other nutrients. In addition to its functional properties, fat is often used to improve the overall quality of foods, including color, texture, structure, flavor and mouthfeel. However, in recent decades, investigations have revealed a correlation between high consumption of fats and increased rates of diseases such as atherosclerosis, coronary artery disease and obesity. Furthermore, it has been observed that saturated fatty acids and trans-unsaturated fatty acids are a greater contributor to diseases such as coronary arterial disease than other types of fats. Thus, over the years, the amount of fat-derived calories in the human diet, as well as the proportion of saturated to unsaturated fats consumed by the population, has changed significantly. The consumption of fats derived from vegetable oils that are rich in cis-unsaturated fatty acids has increased markedly over the years. However, in a number of food products, the complete substitution of saturated fats with unsaturated fats leads to other problems.

Fat blends used in the production of fat-containing products like margarines, spreads and spreadable cheeses, consist of a liquid oil fraction and a so-called hardstock. The liquid oil fraction typically comprises liquid unmodified vegetable oils such as soybean oil, sunflower oil, low erucic acid rapeseed oil (Canola), corn oil and blends of vegetable oils. Hardstock typically comprises a blend of fats that are solid at room temperature. The hardstock contains a high proportion of triglycerides that crystallize to give the final product certain desired physical properties such as texture, creaminess and melt-down in the mouth. Texture typically encompasses a number of desired characteristics such as viscosity, plasticity, solid fat content versus temperature and melting point. For many fat-containing foods such as margarines, spreads and confections, a steep melting curve with nearly complete melting in the range of about 37° C. to about 40° C. approximating body temperature is desirable. Usually, the hardstock is made from naturally occurring hard fats such as tropical oils and animal fat, or fats that are prepared by either partial or full hydrogenation of liquid oils with or without subsequent co-esterification with liquid oils. Furthermore, hard fat fractions can be obtained by different fractionation procedures to obtain hard fats, which can be used as such or are subjected to further modification processes such as inter- and co-esterification. Conventionally the hardstock is composed from several different hard fats in order to obtain the desired physical properties and β'-stable fat crystals in the final product. Because of the importance of hardstock to the aesthetics of the many fat-containing foods, only a certain part of these solid saturated fats can be replaced with unsaturated oils without sacrificing the sensory quality of the product. Furthermore, the melting points of saturated and trans-unsaturated fats are higher than the equivalent cis-unsaturated acids. Thus, the higher melting fats cannot readily be replaced by the more desirable unsaturated fats without loss of texture.

A number of efforts have been undertaken in an attempt to replace at least a portion of the hardstock with other ingredients that are capable of contributing the same sensory benefits to the food product without the undesirable side effects of the saturated fatty acids and trans fatty acids. U.S. Pat. No. 5,354,573 teaches the use of fat-soluble polymers as texturizers in foods. Examples of the polymers are natural polymers such as cutin, polymers based on hydroxy acids, polymers prepared by the condensation of polyhydric alcohols and polybasic acids, polymers derived from polyvinyl alcohols, fatty acid esters of acrylates and polyethylene glycol fatty acid derivatives.

EPO Patent Publication No. 4070658A1 attempts to reduce the percentage of hardstock of edible spreads to a minimum, representing less than 10% by weight of fully hydrogenated fat with a low trans-unsaturated fatty acid content. The remaining fat is derived from liquid oil and is largely unsaturated.

Much effort has been undertaken to replace triglycerides with fully or only partially absorbable synthetic fats. U.S. Pat. No. 3,600,186 discloses synthetic sugar fatty acid esters and sugar alcohol fatty acid esters having at least four fatty acid ester groups. These compounds are said to have the physical properties of ordinary triglyceride fat, but are not digested or absorbed to the same extent as the natural fat when eaten. EPO Patent Publication No. 0375027B1 discloses an edible composition comprising blends of solid and liquid non-digestible fatty material that can be used to replace triglyceride fats in foods. The non-digestible fatty material is a polyol fatty acid polyester, such as sugar fatty acid polyester, sugar alcohol fatty acid ester polyester, polyglycerol fatty acid polyester and mixtures thereof. This material having a particle size of 10 microns or less and a melting point higher than 37° C. is blended together with a liquid non-digestible fatty material having a melting point below 37° C. to give a product which overcomes the anal-leakage problems noted with low melting point sugar fatty acid esters or sugar alcohol fatty acid esters, such as those described in U.S. Pat. No. 3,600,186.

Another approach to obtaining a healthier fatty acid profile of the fat blend to be used in fat-containing products is to alter the composition of the hardstock to reduce to a minimum the levels of fatty acids such as lauric acid and myristic acid. Fatty acids of this type are known for their potential for increasing cholesterol levels in the blood. Typically, the hardstock is produced by co-interesterification of a fully hydrogenated vegetable oil with liquid unsaturated vegetable oils. This procedure is discussed in the Journal of the American Oil Chemists' Society (AOCS) 72, (1995), page 379–382.

Others have attempted to reduce the fat-content of margarines or spreads by the use of stabilizers such as gelatin, pectin, oligofructose and different gels such as xanthan gum, guar gum, alginate, carrageenan and cellulose derivatives. Other fat replacers have also been used in an attempt to mimic the mouth feel of the final product while reducing its total content of saturated and trans-unsaturated fat.

U.S. Pat. No. 5,502,045 discloses the use of stanol fatty acid esters, especially β-sitostanol fatty acid esters, for reducing the absorption of cholesterol. Example 5 of the patent describes a margarine which contains 80% fat. The fatty portion of the margarine was composed of 60% rapeseed oil, 35% partially hardened soybean oil and 5% coconut oil. β-sitostanol fatty acid ester in an amount of 10% and 20% by weight of the fat was added as a diluent to the fat blend. The β-sitostanol fatty acid ester served to dilute both the liquid part of the fat blend as well as the hardstock. It was determined that the margarine produced in the Example was effective in reducing the cholesterol ingestion of patients participating in an intervention study. However, there was no disclosure as to the use of such compositions as texturizers in the solid fat portion of a fat blend.

All of these approaches have certain drawbacks that make them less than a complete solution to the problem of removing harmful fats from food products while maintaining the sensory qualities imparted by those fats when present in the products.

BRIEF DESCRIPTIONS OF THE INVENTION

This invention is based on the surprising finding that stanol and sterol fatty acid esters, such as phytosterol esters, or their blends form crystal networks with similar properties as those of conventional hardstock triglycerides. This finding makes it possible to use these texturizing agents fully or partly as replacements for the conventional hardstock in fat blends to be used in fat-containing products, where the crystallizing fat of the hardstock is of prime importance to the overall sensoric quality.

A conventional fat blend comprises a liquid oil component and a solid fat component comprising a conventional hardstock. The present invention relates to a fat blend and an edible food containing such, including a reduced level of a conventional hardstock rich in absorbable saturated or a trans-unsaturated fat, wherein the solid fat component is composed of either fully a phytosterol ester or ester blend, defined herein as a texturizing agent, or of a blend of said texturizing agent and conventional hardstock. The obtained solid fat of the invention shows similar physical properties as conventional hardstocks and builds up in the final food product a crystal network with similar properties as the conventional hardstock.

The solid fat component of the fat blend in accordance with the present invention comprises a texturizing agent and optionally a hardstock. The solid fat comprises preferably at least 40 weight-%, more preferably at least 50% of the texturizing agent. In certain reduced-fat food products it is even more preferred to have at least 60%, and most preferred with at least 70% of the texturizing agent in the solid fat component. Desirably, the solid fat comprises only a minor amount of hardstock (i.e., less than 15%) and most desirable no hardstock at all. The texturizing agent is preferably used to replace at least an equivalent amount of hardstock in the fat blend. The fat blend to be used in the edible food contains preferably at least 15%, more preferably at least 25% by weight of the texturizing agent.

The phytosterol esters defined herein as texturizing agents comprise unsaturated and saturated fatty acid esters of sterols or stanols as well as mixtures thereof. The term phytosterol is intended to mean saturated and unsaturated sterol alcohols and their blends derived from plants (plant sterols), as well as synthetically produced sterol alcohols and their blends having properties that replicate those of naturally occurring alcohols. These sterol alcohols are characterized by a common polycyclic steroid nucleus comprising a 17 carbon atom ring system, a side chain and a hydroxyl group. The nucleus is either saturated, wherein the sterol alcohol is referred to as a stanol, or unsaturated, wherein the sterol alcohol is referred to as a sterol. For purposes of the present invention, sterol is understood to mean a single sterol or blends of sterols, and stanol is understood to mean a single stanol or blends of stanols.

The texturizing agent is added to the edible food as a replacement for at least a portion of the harmful cholesterol raising fatty substituents in the hardstock (solid fats). The harmful absorbable fatty substituents, which are replaced by the texturizing agent, are composed primarily of triglycerides. Particularly between 40% and 100%, but preferably at least 50% of the harmful fatty substituents in the hardstock are replaced by the texturizing agent. This means that the ratio between the texturizing agent and the solid fat component desirably is at least 0.4, more desirably at least 0.5. Most desirably there is no conventional hardstock in the fat blend. The texturizing agent is composed most preferably of one or more stanol fatty acid esters, but it also can include varying amounts of one or more sterol fatty acid esters, up to about 30% is preferred, when the fatty acids used for preparation of the esters are derived from liquid vegetable oils, such as rapeseed oil, sunflower oil, soybean, oil, corn oil or mixtures of vegetable oils. Even close to 100% (i.e., up to 90–95% or more, such as up to about 100%) of sterol fatty acid esters can be used after proper optimizing of the fatty acid composition to obtain desired melting characteristics.

Campestanol is referred to as the peak obtained by routine gas liquid chromatography containing campestanol and its epimer 24-methyl cholestanol, derived from the saturation of brassicasterol or 22,23-dihydrobrassicasterol. Preferably, the stanol fatty acid ester is a sitostanol fatty acid ester, or a mixture of the sitostanol fatty acid ester and a campestanol fatty acid ester. Alternatively, certain sterol fatty acid esters or their blends may be used provided their melting point and other physical characteristics replicate those of the solid fats. The stanol or sterol fatty acid ester can be prepared by the esterification of a free stanol or a free sterol or a blend of these with a saturated or unsaturated fatty acid. Fatty acid, for purposes of this invention, is understood to mean a single fatty acid or a blend of two or more fatty acids. Likewise, fatty acid ester of sterol or stanol is understood to mean a single fatty acid ester or a blend of fatty acid esters. The fatty acid typically has between 4 and 24, but preferably between 16 and 20, carbon groups in the fatty acid chain. The texturizing agent preferably has a crystalline structure or matrix at room temperature, and behaves surprisingly like a conventional crystallizing fat in food manufacturing processes such as the production of margarine, spreads and spreadable cheeses.

For use as a texturizing agent in food products, the texturizing agent should show high levels of solid fat content between 20° C. and 30° C. as measured by conventional NMR techniques, and have a steep melting curve to preferably be almost fully melted at a temperature between about 37° C. and about 40° C., as measured by differential scanning calorimetry after a directed crystallization procedure. Furthermore, the texturizing agent should be stable in its lower melting polymorphic forms during the entire shelf life of the product. It should be noted that the sterol fatty acids and stanol fatty acids have polymorphic behavior similar to those of conventional crystallizing fats. Thus, the same basic procedures are used for handling and producing fat-containing products based upon their esters as are used for conventional fats. Melting points of single sitosterol and sitostanol (stigmastanol) fatty acid esters in their most stable polymorphic form has been published by Kuksis and Beveridge (J. Org. Chem: 25, (1960) 1209–1219). The sterol esters, stanol esters or blends of these which form stable low melting polymorphic forms in the directed crystallization process conventionally used in the manufacture of fat-containing foods are useful in the present invention. Higher melting polymorphic forms described in this article would cause a bad melt down in the mouth and a hard and brittle structure of the final product, making the product unpalatable.

According to the invention it was surprisingly found that esters of stanol and/or sterol fatty acids even totally can replace the hardstock in conventional fat blends to be used in the preparation of foods like margarines, spreads and spreadable cheeses, giving a crystal network with similar physical and melt-down properties in the mouth. It is obvious for those skilled in the art that the solid fat component disclosed in the present specification can be used in any food, where a fat blend containing crystallizing fats is needed to obtain desirable sensoric and physical properties in the final product. The triglyceride component of conventional hardstock is basically composed of saturated and trans-unsaturated fatty acids. Since these fatty acids have a linear structure, they are easily packed into the crystal lattice during crystallization. The stanol and/or sterol esters contemplated in this specification comprise on the other hand mostly unsaturated fatty acids, which are bent or folded and would therefor not be expected to produce a crystal network with similar melting properties as conventionally used triglyceride hardstocks. Furthermore, conventional triglyceride hardstocks produce stable β'-crystals. β'-crystals are small needle-like crystals that grow together (sintring) to produce the crystal network. One important feature of this crystal network is the very big overall crystal surface, which enables the liquid oil and water droplets to be retained. The fact that the stanol and/or sterol esters according to this invention build up a crystal network with similar properties as that of conventional hardstock triglycerides was therefore a total surprise.

For the purpose of this invention, solid fat is understood to mean the non-liquid part of the fat blend, crystallizing to form a crystal network and giving the end product the desired structural and sensoric properties. In this specification the solid fat is either composed wholly of a texturizing agent defined herein as a phytosterol ester or ester blends or of a blend of said texturizing agent and conventional hardstock. The composition and physical properties of the solid fat are tailor-made to give similar physical properties as conventional triglyceride-based hardstocks. The phytosterol esters can be prepared e.g. by the method described later in Example 1 of this specification. Conventional hardstock fats may be used as part of the solid fat and those skilled in the art are familiar with different compositions of usable hardstocks. It is therefore obvious for a person skilled in the art how to prepare the solid fat of the invention by practicing the teachings of this invention.

In addition to replacing part or all of the hardstock of a conventional fat blend, the invention furthermore includes a process for improving the fatty acid composition of a fat blend to be used in the final food product. Normally, the fatty acids needed to obtain the desired physical properties of the texturizing agent are derived from liquid vegetable oils rich in unsaturated fatty acids. When the conventionally used harmful substituent is replaced by the texturizing agent of the present invention, harmful fatty acids such as saturated and trans-unsaturated fatty acids are partially or entirely replaced by mainly nutritionally desired cis-unsaturated fatty acids. Preferably at least 60 weight-% of the fatty acids in the fat blend including the stanol/sterol ester are derived from vegetable oils. These fatty acids are contained in the liquid oil part as well as in the texturizing agent.

The invention furthermore includes a process for preserving the texture of a food product containing a fat blend, while reducing the amount of the absorbable fat in the product. Much of the absorbable harmful saturated and trans-unsaturated fatty acids are contained in the so-called hardstock, typically added to a food product to improve the texture and other sensory properties thereof. The process comprises substituting, for at least a portion of the hardstock, a texturizing agent consisting of fatty acid esters of sterols, fatty acid esters of stanols or mixtures of these. The hardstock, which is rich in saturated and trans-unsaturated fatty acids and contains a high level of triglycerides, is replaced in whole or in part with the texturizing agent. The ratio between texturzing agent and solid fat is preferably at least 0.4, more preferably at least 0.5. Even more preferably are ratios of at least 0.6, most preferably at least 0.7. Most desirably, there is no hardstock in the fat blend. The texturizing agent preferably comprises a stanol fatty acid ester optionally containing different amounts of a sterol fatty acid ester, preferably up to as much as 30%. In addition the texturizing agent can even comprise up to 100% of sterol fatty acid ester after proper optimization of the fatty acid composition. The stanol and/or sterol fatty acid ester used in the process can be prepared by the esterification of a stanol and/or sterol and a fatty acid in the presence of a food-grade catalyst. The process typically involves interesterification of the stanol and a fatty acid ester or a fatty acid ester blend.

The invention furthermore comprises a process for producing a food product such as a fat blend containing a reduced level of absorbable fat, the process comprising utilizing the solid fat of the invention in the food product, wherein a portion or all of the conventional nutritionally undesired hardstock in the composition is replaced by a texturizing agent consisting of fatty acid esters of sterols, fatty acid esters of stanols or blends of these. Desirable texturizing agents useful in the invention comprise wood and vegetable oil stanol esters which are blended with liquid vegetable oils such as rapeseed oil. In one embodiment, the fat blend comprises between about 29% and about 35% of wood stanol ester, about 54% and about 75% of rapeseed oil and about 3% and about 17% of hardstock rich in saturated and/or trans-unsaturated fatty acids. Desirably, the texture and melting characteristics of the solid fat comprising at least 40% by weight of the texturizing agent, result in a product having sensory characteristics similar to products based on fat blends with conventional hardstock, but with markedly improved fatty acid composition from a nutritional point of view.

The invention also relates to a solid fat component useful in edible food, the solid fat component comprising a texturizing agent and optionally some hardstock. The composition may be incorporated into a fat blend which also contains a liquid vegetable oil preferably rich in unsaturated fatty acids. The solid fat component comprises preferably at least 40% by weight of texturizing agent. The solid fat component may contain a minor amount of a hardstock rich in saturated and/or trans-unsaturated fats. The texturizing agent is a sterol fatty acid ester or a stanol fatty acid ester or a mixture of the two. The ester preferably is prepared by esterification of a stanol and/or a sterol derived from wood or vegetable oil, but can also be prepared from sterol and stanol blends derived from other sources. Additionally, the sterol or stanol blend can be obtained by blending sterols and stanols derived from different sources. A liquid vegetable oil like rapeseed oil (LEAR) having a very low content of saturated fatty acids is a preferred source of fatty acids useful for the esterification and also for blending with the stanol ester or sterol ester. Other saturated or unsaturated fatty acids which may be used are derivable from edible vegetable oils or fats, preferentially vegetable liquid oils, such as sunflower oil, soybean oil, corn oil and their mixtures. It is obvious to those skilled in the art that any liquid edible oil or blends of two or more of these can be used as a source of fatty acids for the esterification. The most desirable solid fat component has a melting profile wherein most of the crystallized material has fully melted in the temperature range of between about 37° C. and about 40° C. as measured by differential scanning calorimetry after a directed crystallization procedure. In some applications a texturizing agent melting at higher temperatures might be desired. In these cases edible hard fats, such as coconut oil, palm oil, partially hydrogenated vegetable oils or milk fat, can be used as a source of fatty acids for the esterification.

The invention also relates to the process of increasing the nutritional and/or health values of a fat blend comprising a solid fat and a liquid oil while concurrently reducing the amount of absorbable fat in the fat blend. The process comprises the use in the solid fat of at least 40%, preferably at least 50% by weight of a texturizing agent to replace at least an equivalent amount of hardstock of the fat blend. The texturizing agent is composed primarily of at least one stanol fatty acid ester, optionally containing different amounts of at least one sterol fatty acid ester, preferably up to 30% of sterol fatty acid ester, but most preferably no more than about 10% of sterol fatty acid ester. The texturizing agent can contain up to 100% of sterol fatty acid esters after proper optimizing of the fatty acid composition involving the use of elevated amounts of saturated fatty acids. The ester or blend of esters can be produced by the esterification of the corresponding stanol and/or sterol with a fatty acid or fatty acid blend preferably having an average carbon chain length between about C-16 and C-20. The texturizing agent has a crystalline structure at room temperature and a melting point preferentially between about 37° C. and about 40° C. The melting point is measured by differential scanning calorimetry after directed crystallization of the texturizing agent according to established procedures well known in the art.

It is an object of the present invention to overcome the drawbacks of the prior approaches, while substituting for a portion of the hardstock a texturizing agent which mimics the sensory characteristics of the hardstock.

Another object of the present invention is to reduce the amount of saturated fats and trans-unsaturated fatty acids from edible foods without sacrifice of texture and other desirable characteristics of the foods.

Still another object of the present invention is the replacement of hardstock containing harmful saturated and trans-unsaturated fatty acids in foods and food additives with a healthier phytosterol fatty acid ester based substance that can be customized to mimic the texture and other sensory characteristics of the hardstock which it replaces.

Another object of the present invention is a food product in which some or all of the hardstock is replaced with a texturizing agent comprising phytosterol fatty acid esters in a fat blend containing unsaturated fatty acids derived from liquid vegetable oils as the sole absorbable fat.

Yet another object of the present invention is to replace saturated and trans-unsaturated fatty acids in edible foods with a more healthful substitute having a secondary effect of blocking absorption of cholesterol from the intestinal tract and reducing the amount of absorbable fat.

These and other objects of the present invention will become apparent upon a reading of the description of the invention, and the drawing in which FIG. 1 shows a melting profile of two compositions useful in the present invention.

DETAILED DISCUSSION OF THE INVENTION

This invention describes the use of a stanol or sterol fatty acid ester or mixture of these esters as a texturizing agent in foods. Stanol fatty acid esters when added to the diet have, in earlier studies, been shown to effectively lower the blood serum cholesterol level, especially LDL-cholesterol, in man (see U.S. Pat. No. 5,502,045). This beneficial effect is obtained with a daily intake between about 2 and 2½ grams of stanol fatty acid esters calculated as free stanol.

In addition to the beneficial cholesterol level reducing effect of stanol fatty acid esters, it has now been surprisingly discovered that these esters form a crystal network in the final product that is similar to the crystallinity obtained with prior used hardstock triglycerides. Thus, stanol and/or sterol fatty acid esters can partly or fully replace the hardstock in fat blends to be used in foods such as margarines, spreads, mayonnaise, cooking oils, shortenings and spreadable cheeses.

The advantages of using the stanol or sterol fatty acid esters for this purpose is that their physical properties can be tailor-made by changing the fatty acid composition. This is achieved by selecting a fatty acid which contributes the requisite melting point profile to the phytosterol ester. The carbon chain length of the fatty acid affects the melting point of the ester, i.e. melting points decrease with increasing molecular weight of the fatty acid until a minimum is reached at the C14–C16 region after which the melting points increase. Also a contributing factor is the degree of saturation or unsaturation of the fatty acid, with a greater degree of saturation being accompanied by a higher melting point.

The physical properties likewise can be controlled by varying the ratio of the stanol and the sterol in the fatty acid ester. Again, as with the fatty acid, the saturated stanol exhibits a higher melting profile than the corresponding sterol. Because a goal of the present invention is to replace saturated fats with unsaturated fats, the preferred esters are based on use of unsaturated preferably highly or polyunsaturated fatty acids in the esters. However, it should be pointed out that the sterol or stanol portion of the fatty acid ester is not digestible or absorbable into the body and therefore, the selection between a stanol or a sterol based on the degree of saturation is not a significant factor. However, the difference in the melting profile between a sterol and a stanol plays a significant role in the selection of the proper texturizing agent useful in the production of the fatty acid ester. The most convenient way to achieve this objective is to use fatty acids derived from liquid vegetable oils. For example, the stanol fatty acid ester of low erucic acid rapeseed oil (Canola variety) is an ester which shows physical properties similar to those of the prior used, hard fat fractions. This stanol fatty acid ester blend can suitably be used in the production of margarines and spreads with a fat content ranging from 80% to 35%. It is obvious from the physical behavior of such stanol fatty acid esters that products with even lower fat contents comprising conventional gelling or stabilizing systems can be prepared without seriously compromising texture.

U.S. Pat. No. 5,502,045 clearly shows the effect of stanol fatty acid esters in reducing the absorption of cholesterol from the intestinal tract. This reduction causes significant lowering of both total and especially LDL-cholesterol levels in man. Thus, in addition to acting as a texturizer in a fat blend, replacing specifically a portion of the harmful absorbable fat in the diet, the present invention also supplies a means for introducing an effective dosage of stanol esters in the daily diet, resulting in an overall reduction of cholesterol absorption from all food sources. Furthermore, the stanol portion of the ester, representing about 60% or more of the stanol fatty acid ester, is virtually unabsorbed and thus provides no calories.

It should be noted that the fat blends containing phytosterol ester used for lowering the cholesterol level disclosed in Example 5 of U.S. Pat. No. 5,502,045 were produced to show that fat soluble sitostanol esters could be added to fat blends to be used in the production of margarines in amounts of 10 or 20% of the total fat blend. The surprising physical properties of phytosterol esters enabling the fully or partly replacement of the nutritionally undesired triglyceride hardstock were not evident at the time of the invention described in U.S. Pat. No. 5,502,045. In the Example described in the patent the sitostanol ester was added to the existing fat blend and thereby it diluted both the liquid oil part and the hardstock of the fat blend. The surprising physical properties of phytosterol fatty acid esters contemplated in the present specification enabling substantial and even a total replacement of the conventional hardstock was therefore not obvious from the U.S. Pat. No. 5,502,045.

For the teachings of the present invention, a preferred method of preparing sterol and stanol fatty acid esters is described in U.S. Pat. No. 5,502,045. This method has the advantage over prior preparations in that these prior processes utilize reagents which cannot be accepted in the manufacture of products intended to be used as nutrients in foods. The use of toxic reagents such as thionyl chloride or anhydride derivatives of fatty acids is common in these earlier processes. The preferred manufacturing procedure relies on the interesterification process used widely by the edible fat and oil industry. This procedure uses no other substances than the free stanol, a fatty acid ester or a fatty acid ester mixture and an interesterification catalyst such as sodium ethylate. One important feature of the method is that the fatty acid ester is used in excess and functions as a solvent, solubilizing the stanol under the conditions used (vacuum 5–15 mmHg). The reaction gives a mixture of fatty acid esters and stanol fatty acid esters. The stanol fatty acid ester can easily be concentrated into almost pure stanol fatty acid esters by vacuum distillation, which removes the excess of the fatty acid esters. Alternatively, the blend can be added as such to the final fat blend, followed by a deodorizing step.

Stanols are found in small amounts in nature in such products as wheat, rye, corn and triticale. They can also easily be produced by hydrogenation of natural sterol mixtures such as vegetable oil-based sterol mixtures or commercially available wood sterols. The plant sterols thus obtained can be converted into stanols by well known hydrogenation techniques such as those based on the use of a Pd/C catalyst in organic solvents. A wide variety of palladium catalysts and solvents, known to those skilled in the art, can be used to carry out the hydrogenation. It is obvious for those skilled in the art that sterols or stanols or their blends of other origins can be used to produce phytosterol esters as defined in the present invention.

Examples of suitable phytosterols useful in the teaching of the present invention are sitosterol, campesterol, brassicasterol, 22,23-dihydrobrassicasterol and stigmasterol. Preferably, these are hydrogenated to form the corresponding saturated compounds, sitostanol, campestanol, 24β-methyl cholestanol, etc.

The fatty acids and fatty acid esters useful in the present invention are selected from the group consisting of saturated straight chain fatty acids, saturated branched chain fatty acids and unsaturated fatty acids. The carbon chain length of the fatty acid useful in the present invention is typically between 2 and 24. However, preferably, the fatty acid or blends of fatty acid useful in the present invention are selected so that the melting point, texture and other sensory characteristics of the sterol fatty acid ester, the stanol fatty acid ester or their blends closely replicates the corresponding properties of the hardstock that is being replaced. Particularly suitable in the present invention are fatty acids having an average carbon chain length between 12 and 24, more specifically between about 16 and 20, and preferably about 18.

The following examples are presented in order to gain a fuller understanding of the present invention and the practice thereof

EXAMPLE 1

Hydrogenation of Sterol Mixtures

A commercially available plant sterol mixture obtained from vegetable oil distillate (composition: campesterol+22, 23-dihydrobrassicasterol 26.7%, brassicasterol 1,0%, campestanol 1.7%, stigmasterol 18.4%, sitosterol 49.1% and sitostanol 2.9%) was hydrogenated in a pilot scale reactor (25 liter). Twenty-six grams of a fibrous Pd catalyst (Smop-20; Pd content 10 weight-%, Smoptech, Turku, Finland), 26 g distilled water for the activation of the catalyst and 11.7 kg propanol were fed into the reactor. The reactor was flushed with nitrogen and the activation of the catalyst was carried out under hydrogen gas at a pressure of 1 bar and at a temperature of 65° C. for 30 minutes. After the activation, the blend was cooled to 40° C., after which 1.3 kg of the sterol mixture was added.

The propanol plant sterol mixture was heated under nitrogen atmosphere to 65° C., after which nitrogen was displaced by hydrogen. After that, a thorough flushing with hydrogen was done. The hydrogenation reaction was carried out at a hydrogen pressure of 1 bar. The normal conversion time is about 120 minutes. The conversion can easily be monitored by taking aliquots, which are analyzed by HPLC.

The hydrogen pressure was dropped and the reactor was flushed with nitrogen. The fibrous catalyst was filtered off with nitrogen pressure. The propanol stanol blend obtained was left to crystallize overnight at 10° C. after which the stanol crystals were vacuum filtered and the cake was washed with 0.5 kg cold propanol. The obtained vegetable oil stanol mixture was dried at 60° C. in a vacuum cupboard. The yield was 75% and the composition of the obtained stanol mixture was as follows according to capillary GC analysis: campesterol 0.2%, campestanol 28.9%, stigmasterol 0.1%, sitosterol 0.2%, sitostanol 70.1%. It should be noted that brassicasterol and 22,23-dihydrobrassicasterol is hydrogenated into 24β-methyl cholestanol, an epimer of campestanol, but since these appear in the same peak with ordinary capillary gas chromatographic procedures which is unable to separate according to chirality, it is usually calculated as campestanol.

Preparation of Stanol Fatty Acid Esters

A stanol fatty acid ester mixture was prepared on a pilot scale. Six kg of the vegetable oil stanol obtained by combining several batches obtained by the hydrogenating procedure given previously was dried overnight at 60° C. and esterified with an 8.6 kg low erucic acid rapeseed oil methyl ester mixture. The composition of the stanol blends used was as follows: campesterol 0.4%, campestanol (+24β-methyl cholestanol) 29.7%, stigmasterol 0.1%, sitosterol 0.4% and sitostanol 68.0%. The stanol content of the blend was 98.2%. The esterification was carried out as follows:

The mixture of the vegetable oil stanols and low erucic rapeseed oil fatty acid methyl ester was heated in a reactor vessel at 90 to 120° C. under a vacuum of 5–15 mmHg. After drying for 1 hour, 21 g sodium ethylate was added and the reaction was continued for about 2 hours. The catalyst was destroyed by the addition of 30% water (by weight) at 90° C. After phase separation, the water phase was removed and a second washing was carried out. After the separation of the water phase, the oily phase was vacuum dried at 95° C. with a stirring effect of 200 rpm. The stanol fatty acid mixture was lightly bleached and deodorized for 20 minutes at 30 mmHg and a temperature of 110° C. with 1.0% of bleaching earth (Tonsil Optimum FF, Südchemie, Germany) under a stirring effect of 200 rpm. The bleaching earth was filtered off and a tasteless stanol fatty acid ester was obtained for further use in different food manufacturing processes by conventional deodorizing techniques. Alternatively, the stanol fatty acid ester-fatty acid ester mixture can be added to the final fat blend prior to the deodorization of the final fat blend. Yet another alternative is to remove the excess of methyl esters by vacuum distillation before use.

The conversion of the esterification process is normally higher than 99% measured by a fast HPLC method and the yield is about 95%.

Melting Curves of Stanol Fatty Acid Esters

FIG. 1 shows melting curves for two stanol esters prepared by esterification of wood stanol and vegetable oil stanol according to the procedure described above. The esters were prepared by interesterification of each stanol with low erucic acid rapeseed oil having a fatty acid composition between C 14 and C24 with about 90% in the range of C18:1→C18:3. The composition in weight percentages of the stanol esters are as follows:

| | Wood stanol ester | Vegetable oil stanol ester |
|---|---|---|
| Campesterol(1) | 0.8 | 0.8 |
| Campestanol(2) | 8.5 | 30.0 |
| Sitosterol | 4.8 | 1.8 |
| Sitostanol | 85.7 | 67.0 |
| Others | 0.1 | 0.4 |

(1)Including campesterol and 22,23-dihydrobrassicasterol
(2)Including campestanol and its epimer 24-methyl cholestanol derived from the saturation of brassicasterol and 22,23-dihydrobrassicasterol.

The melting curves obtained by Differential Scanning Calorimetry (DSC) are seen in FIG. 1. The melting curve is obtained after melting the sample (about 8 mg) at 75° C. for 10 minutes after which the sample is crystallized by cooling at 10° C./minute to −50° C., where the sample is kept for five minutes. The melting curve is obtained by heating by 10° C./minute to 70° C. As seen in FIG. 1, both stanol esters melt very rapidly in the range of 35° C. with the major peak of wood stanol ester (curve A) fully melted at about 36° C. and the major peak of vegetable based stanol ester (curve B) fully melted at about 39° C. The very steep melting curve is very desirable for good melting properties, especially the melting in mouth of the final product.

EXAMPLE 2

Stanol Fatty Acid Esters as Texturizing Agents

Different fatty acid compositions were used for esterification of wood or vegetable oil stanol.
1) Wood stanol ester with fatty acids derived from rapeseed oil
2) Vegetable oil stanol ester with fatty acids derived from rapeseed oil
3) Wood stanol ester with fatty acids derived from soybean oil
4) Wood stanol ester with fatty acids derived from a rapeseed oil-palm oil blend (85:15)
5) Wood stanol ester with fatty acids derived from a rapeseed oil-palm oil blend (70:30)
6) Wood stanol ester with fatty acids derived from butter oil The solid fat content (percent of fat) of each ester which is a solid at various temperatures, was determined by conventional NMR technique using an ordinary serial tempering method, and is shown in Table I.

TABLE I

| Texturizing agent | 10° C. | 20° C. | 30° C. | 35° C. | 40° C. | 45° C. |
|---|---|---|---|---|---|---|
| 1 | 84.1 | 70.4 | 26.6 | 7.0 | 4.6 | 2.5 |
| 2 | 82.3 | 70.4 | 34.9 | 9.4 | 5.2 | 2.6 |
| 3 | 74.3 | 52.8 | 35.3 | 26.3 | 21.7 | 17.9 |
| 4 | 90.6 | 85.0 | 60.2 | 31.6 | 22.7 | 17.4 |
| 5 | 88.1 | 82.0 | 64.3 | 49.5 | 38.0 | 29.8 |
| 6 | 83.0 | 75.6 | 66.8 | 64.9 | 62.4 | 55.2 |

Wood stanol esters and vegetable oil stanol esters are useful in the teachings of the present invention if they have a suitable melting profile and have other properties which contribute favorably to the texture and other sensory attributes of the fat blend. Thus, esters prepared by the esterification of stanols with fatty acids such as fatty acids from sunflower oil, corn oil, soybean oil, butter oil, rapeseed oil as well as blends of vegetable oils and vegetable fats have been found to give a melting profile allowing these to be blended with liquid fat blends as a replacement for most or all of the saturated or trans-unsaturated fats in the fat blend.

EXAMPLE 3

Sterol Esters as Texturizing Agents

Although the invention is particularly beneficial when using stanol fatty acid esters with or without minor amounts of sterol fatty acid esters, it can likewise be practiced using sterol fatty acid esters which have been blended to provide a solid fat content similar to the hardstock being replaced. The following blends of sterol esters are examples that can be used as texturizing agents.

Blends of Sterol Esters
1. Wood sterol ester with rapeseed fatty acids 90%, wood sterol ester with palm oil fatty acids 10%
2. Wood sterol ester with rapeseed fatty acids 80%, wood sterol ester with palm oil fatty acids 20%
3. Wood sterol ester with rapeseed fatty acids 70%, wood sterol ester with palm oil fatty acids 30%
4. Wood sterol ester with rapeseed oil fatty acids 80%, wood sterol ester with palm oil fatty acids 10%, wood sterol ester with coconut fatty acids 10%

5. Wood sterol ester with rapeseed oil fatty acids 90%, wood sterol ester with coconut fatty acids 10%
6. Wood sterol ester with rapeseed oil fatty acids 80%, wood sterol ester with coconut fatty acids 20%
7. Wood sterol ester with rapeseed oil fatty acids 70%, wood sterol ester with coconut fatty acids 30%
8. Vegetable oil sterol esters with rapeseed oil fatty acids 85%, vegetable oil sterol esters with palm oil fatty acids 15%

In blends 1–7, the sterol composition (weight-%) as obtained by a routine gas liquid chromatographic method is as follows:

| | |
|---|---|
| Campesterol | 7.8% |
| Campestanol | 1.2% |
| Stigmasterol | 0.5% |
| Sitosterol | 77.3% |
| Sitostanol | 13.0% |

Campesterol 7.8%
Campesterol 1.2%
Stigmasterol .05%
Sitosterol 77.3%
Sitostanol 13.0%

In blend 8 the sterol composition is:

| | |
|---|---|
| Brassicasterol | 2.8% |
| Campesterol | 28.2% |
| Stigmasterol | 16.5% |
| Sitosterol | 49.7% |
| Other unsaturated sterols | 2.8% |

Brassicasterol 2.8%
Campesterol 28.2%
Stigmasterol 16.5%
Sitosterol 49.7%
Other unsaturated sterols 2.8%

The solid fat content of the sterol ester blends at various temperatures is shown in Table II.

TABLE II

| Sterol Blend | 10° C. | 20° C. | 30° C. | 35° C. | 40° C. | 45° C. |
|---|---|---|---|---|---|---|
| 1 | 63.0 | 24.9 | 12.1 | 9.0 | 7.0 | 4.7 |
| 2 | 68.1 | 33.2 | 19.7 | 16.0 | 12.8 | 10.1 |
| 3 | 71.1 | 41.3 | 26.6 | 22.2 | 18.6 | 15.8 |
| 4 | 71.1 | 25.7 | 13.5 | 10.2 | 7.4 | 5.3 |
| 5 | 69.4 | 15.5 | 6.1 | 3.7 | 1.7 | 0.0 |
| 6 | 69.3 | 35.9 | 8.3 | 4.7 | 1.8 | 0.0 |
| 7 | 69.7 | 50.3 | 15.1 | 10.9 | 6.2 | 2.1 |
| 8 | 69.7 | 33.8 | 18.5 | 14.5 | 11.2 | 8.6 |

The data in Table II clearly shows that by optimizing the fatty acid composition of the wood and vegetable oil sterol fatty acid esters, the melting characteristics of the blends make them suitable as replacements for components in the hardstock rich in saturated and trans-unsaturated fatty acids to impart texture and other sensory properties to the foods. Although these sterol esters contain small amounts of stanol esters it is obvious that sterol ester blends based entirely on unsaturated sterols, after proper optimizing of the fatty acid composition, also will obtain desirable melting characteristics making them suitable for use as texturizing agents.

EXAMPLE 4

Texturizing Agents with Fatty Acid Part Derived from Rapeseed Oil

The following data shows that sterol fatty acid esters can be used as a minor component of a blend with stanol fatty acid esters. The sterol or stanol esters are prepared with fatty acids derived from low erucic acid rapeseed oil. The blend is useful as a substitute for hardstock in fat-containing margarines, cheeses, spreads and the like. The following phytosterol esters and hardstocks were prepared and tested to determine their melting profile:

Sterol and Stanol Fatty Acid Esters or Their Blends
1. Wood stanol ester
2. Vegetable oil stanol ester
3. Wood sterol ester
4. Vegetable oil sterol ester
5. Vegetable oil sterol ester 15%, vegetable oil stanol ester 85%
6. Vegetable oil sterol ester 25%, vegetable oil stanol ester 75%
7. Wood sterol ester 15%, wood stanol ester 85%
8. Wood sterol ester 25%, wood stanol ester 75%
9. Partially hydrogenated soybean oil (dropping point 42° C.)
10. Partially hydrogenated rapeseed oil/palm oil blend (dropping point 42° C.)
11. Palm stearine (dropping point≈49° C.)
12. Palm stearine/coconut oil blend, interesterified (dropping point 42° C.)

These blends were analyzed using the technique for analyzing the solid fat content as described in Example 2, with the results outlined in the following table:

TABLE III

| Sterol blend | 10° C. | 20° C. | 30° C. | 35° C. | 40° C. | 45° C. |
|---|---|---|---|---|---|---|
| 1 | 84.1 | 70.4 | 26.6 | 7.0 | 4.6 | 2.5 |
| 2 | 82.3 | 70.2 | 34.9 | 9.4 | 5.2 | 2.6 |
| 3 | 25.5 | 5.4 | 1.9 | 0.7 | 0.5 | 0.3 |
| 4 | 40.4 | 11.6 | 3.5 | 1.7 | 1.1 | 0.3 |
| 5 | 76.6 | 60.8 | 20.5 | 6.8 | 3.9 | 2.4 |
| 6 | 73.4 | 55.7 | 13.5 | 6.3 | 3.2 | 1.7 |
| 7 | 72.7 | 56.0 | 13.7 | 5.5 | 3.5 | 2.5 |
| 8 | 68.7 | 49.3 | 9.0 | 5.3 | 3.2 | 1.9 |
| 9* | nd** | 68–72 | 38–42 | 18–22 | 5–9 | ≦1 |
| 10* | nd** | 50–54 | 20–24 | 7–11 | ≦1.5 | 0 |
| 11* | nd** | 51–56 | 26–31 | 17–21 | 11–16 | 6–10 |
| 12* | 68–72 | 47–51 | 24–26 | 14–16 | 5–7 | ≦4 |

*For comparison components of hardstock conventionally used in the commercial production of fat blends.
**not determined The results clearly show that the stanol esters and blends of the stanol esters with up to 30% of sterol esters have solid fat content values that are in the same range as the fat values of the highly saturated and/or trans-fatty acid containing components prior used in the hardstock of commercial fat blends. The 100% wood and vegetable oil sterol esters (3 and 4) have too low a melting profile to be used as a replacement for the hardstock without at least a partial loss of sensory characteristics. However, by optimizing the fatty acid composition of blends 3 and 4 sterol fatty acid esters with desirable physical properties can be obtained as shown in Table II blend 8.

EXAMPLE 5

Fat Blends Containing Solid Fat Components According to the Invention

Several fat blends based on various weight ratios of wood stanol ester and rapeseed oil, with and without hardstock, were prepared. The various ratios are shown below.

| | |
|---|---|
| Fat blend 1: | Wood stanol ester 35%, rapeseed oil (LEAR) 65% |
| Fat blend 2: | Wood stanol ester 30%, rapeseed oil 70% |
| Fat blend 3: | Wood stanol ester 25%, rapeseed oil 75% |
| Fat blend 4: | Wood stanol ester 35%, rapeseed oil 62%, trans free hardstock* 3% |
| Fat blend 5: | Wood stanol ester 29%, rapeseed oil 66%, trans free hardstock 5% |
| Fat blend 6: | Wood stanol ester 29%, rapeseed oil 60%, trans free hardstock 11% |
| Fat blend 7: | Wood stanol ester 29%, rapeseed oil 57%, trans free hardstock 14% |
| Fat blend 8: | Wood stanol ester 29%, rapeseed oil 54%, trans free hardstock 17% |
| Fat blend 9: | Wood stanol ester 25%, rapeseed oil 60%, trans free hardstock 15% |
| Fat blend 10: | Wood stanol ester 20%, rapeseed oil 60%, trans free hardstock 20% |
| Fat blend 11: | Wood stanol ester 16%, rapeseed oil 60%, trans free hardstock 24% |
| Fat blend 12: | Wood stanol ester 15%, rapeseed oil 63%, trans free hardstock 22% |

*Trans free means a fat blend virtually free from trans fatty acids.

Fat blend 1: Wood stanol ester 35%, rapeseed oil (LEAR) 65%
Fat blend 2: Wood stanol ester 30%, rapseed oil 70%
Fat blend 3: Wood stanol ester 25%, rapseed oil 75%
Fat blend 4: Wood stanol ester 35%, rapseed oil 62%, trans free hardstock* 3%
Fat blend 5: Wood stanol ester 29%, rapseed oil 66%, trans free hardstock 5%
Fat blend 6: Wood stanol ester 29%, rapseed oil 60%, trans free hardstock 11%
Fat blend 7: Wood stanol ester 29%, rapseed oil 57%, trans free hardstock 14%
Fat blend 8: Wood stanol ester 29%, rapseed oil 54%, trans free hardstock 17%
Fat blend 9: Wood stanol ester 25%, rapseed oil 60%, trans free hardstock 15%
Fat blend 10: Wood stanol ester 20%, rapseed oil 60%, trans free hardstock 20%
Fat blend 11: Wood stanol ester 16%, rapseed oil 60%, trans free hardstock 24%
Fat blend 12: Wood stanol ester 15%, rapseed oil 63%, trans free hardstock 22%

*Trans free means a fat blend virtually free from trans fatty acids.

Using the technique described in Example 2, the solid fat content of each blend, at temperatures between 10° C. and 45° C. were measured and the results tabulated in Table IV.

TABLE IV

| Fat blend | 10° C. | 20° C. | 30° C. | 35° C. | 40° C. | 45° C. |
|---|---|---|---|---|---|---|
| 1 | 18.2 | 8.5 | 1.6 | 1.1 | 0.9 | 0.1 |
| 2 | 14.3 | 5.5 | 1.3 | 1.0 | 0.5 | 0.0 |
| 3 | 10.6 | 2.4 | 0.9 | 0.7 | 0.0 | 0.0 |
| 4 | 19.2 | 8.6 | 1.7 | 1.1 | 0.5 | 0.3 |
| 5 | 15.3 | 5.2 | 1.1 | 0.4 | 0.2 | 0.1 |
| 6 | 17.5 | 6.2 | 1.4 | 0.2 | 0.2 | 0.1 |
| 7 | 19.4 | 7.5 | 1.7 | 0.4 | 0.2 | 0.1 |
| 8 | 20.9 | 8.4 | 2.5 | 0.8 | 0.3 | 0.2 |
| 9 | 16.6 | 5.6 | 2.6 | 1.1 | 0.5 | 0.0 |
| 10 | 17.0 | 6.4 | 3.3 | 1.7 | 0.2 | 0.0 |
| 11 | 16.9 | 7.5 | 3.4 | 2.0 | 0.4 | 0.0 |
| 12 | 14.7 | 6.3 | 3.1 | 1.8 | 0.6 | 0.0 |

The solid fat content obtained in fat blends 1 through 12 clearly indicates that these fat blends can be used in the production of fat-containing products, where hard fat is needed for the final structure of the product. Only the fat blend 3 is too soft for use in ordinary margarines and spreads. Fat blends 1–3 are highly desirable in that the hardstock is replaced entirely by the stanol ester/rapeseed oil, whereby all of the absorbable oil is available from the highly unsaturated liquid rapeseed oil rather than from the much less desirable saturated triglycerides of the hardstock.

It is further contemplated that the present invention can be practiced by blending together two or more sterol esters to provide a substituent which can be blended with liquid vegetable oils rich in unsaturated fatty acid to replace most or all of the saturated or trans-unsaturated fatty acid in the fat blend. Blends of a wood sterol fatty acid containing about 85% sterol as campesterol or sitosterol and the remainder being stanol, is reacted with various fatty acids to produce the sterol ester. Several of these esters are blended together according to the following formulations to give products having favorable temperature profiles to serve as replacements for the harmful fats in hardstock.

1. A mixture of 70% to 90% of rapeseed fatty acid ester and 30% to 10% of palm oil fatty acid ester of sterol.
2. A mixture of 70% to 90% of rapeseed oil fatty acid ester and 30% to 10% of a coconut fatty acid ester of sterol.
3. A mixture of 80% rapeseed oil fatty acid ester, 10% palm oil fatty acid ester and 10% coconut fatty acid ester of sterol.

EXAMPLE 6

Production of a 60% Margarine with Stanol Ester

A 60% margarine was produced with a fat blend comprising 35% by weight of vegetable oil stanol fatty acid ester with fatty acids derived from rapeseed oil and 65% rapeseed oil on a Gerstenberg & Agger 3×57 pilot scale perfector. The fat blend was obtained by the blending of a bleached and deodorized stanol fatty acid ester and conventionally purified rapeseed oil. The capacity used was 60 kg/h. The stanol content of the product was targeted to be about 12 g/100 g product, which would provide a daily intake of about 2.4 g stanols at usage level of 20 g margarine/day. The product was produced according to the following recipe:

| | |
|---|---|
| Fat blend including the vegetable oil stanol fatty acid esters | 60% |
| Water | 39% |
| Salt | 0.5% |
| Emulsifiers | |
| Sodium bicarbonate and citric acid as pH-regulating agents | 0.5% total |
| β-carotene as coloring agent | |
| Flavors | |

The obtained margarine was packed into 250 g polypropene tubs, which were sealed by an aluminum foil. The taste and texture of the products were equal to commercial 60% margarines. No oiling out was seen even during a storage for three months. The obtained product contains about 48% absorbable fat with a fatty acid composition (polyunsaturated fatty acid 34%, monounsaturated fatty acid 59.2%, and saturated fatty acid 6.8%) close to that of liquid rapeseed oil. The fatty acid composition of the product was as follows:

| | |
|---|---|
| Polyunsaturated fatty acids | 15.1 g/100 g product |
| Monounsaturated fatty acids | 26.9 g/100 g product |

| | |
|---|---|
| Saturated fatty acids | 3.1 g/100 g product |
| Trans fatty acids | 0.3 g/100 g product |

EXAMPLE 7
Production of a 40% Fat Spread with Stanol Ester

The composition of the fat blend used was as follows: wood stanol fatty acid esters with fatty acids derived from rapeseed oil 33.3 weight-%, rapeseed oil 59.7 weight-% and an interesterified blend of palm stearine and coconut oil 7%. The blend was prepared by blending the melted deodorized wood stanol fatty acid ester with rapeseed oil and the hardstock component. The spread was produced on a Gerstenberg & Agger 3×57 pilot scale perfector. The capacity used was 45 kg/h. The product was produced according to the following recipe:

| | |
|---|---|
| Fat blend including the stanol fatty acid esters | 40.0% |
| Water | 56.4% |
| Gelatin | 2.5% |
| Salt | 0.5% |
| Emulsifiers | 0.2% |
| Potassium sorbate | 0.1% |
| Butter milk powder | 0.25% |
| Flavors | |
| Citric acid as pH-regulating agent | 0.05% total |
| β-carotene as coloring agent | |

The obtained spread was packed into 250 g polypropene tubs, which were sealed by an aluminum foil. The appearance of the product was equal to conventional 40% spreads. The taste of the obtained product was good with a fast melt down in the mouth. No loose water or oiling out was observed and the spreadability was good.

The product contains about 32% of absorbable fat with the following fatty acid composition:

| | |
|---|---|
| Polyunsaturated fatty acids | 9.2 g/100 g product |
| Monounsaturated fatty acids | 17.4 g/100 g product |
| Saturated fatty acids | 3.6 g/100 g product |
| Trans fatty acids | 0.2 g/100 g product |

EXAMPLE 8
Production of a Spreadable Cheese with Stanol Ester

The composition of the fat blend used was as follows: wood stanol fatty acid esters with fatty acids derived from rapeseed oil 33.3 weight-%, rapeseed oil 59.7 weight-%, and an interesterified blend of palm stearine and coconut oil 7%. The blend was prepared by blending the melted deodorized wood stanol fatty acid ester with rapeseed oil and the hardstock component.

The spreadable cheese was produced in a Stephan mixer with a batch capacity of 25 kg. The product was produced according to the following recipe:

| | |
|---|---|
| Curd | 55.2% |
| Fat blend including the stanol fatty acid esters | 25.4% |
| Condensate | 13.2% |
| Stabilizer | 1.0% |
| Milk proteins | 2.6% |
| Salt | 0.7% |
| Potassium sorbate | 0.1% |
| Garlic flavor preparation | 1.8% |
| Lactic acid as pH-regulating agent | 0.05% total |
| Flavor | |

The ingredients were mixed at room temperature in the Stephan mixer for about 1 minute, after which the mixture was heated by direct steam injection (0.8 bar) to 60° C. and was mixed for 1 minute. The temperature was increased to 72° C. and mixed for 1 minute. The obtained product was packed hot into 100 g polyporpene tubs, which were sealed by an aluminum foil.

The taste of the product is similar to a product produced with a conventional fat blend. The fat content of the product is 26%, the absorbable fat content is 21% and the fatty acid composition is as follows:

| | |
|---|---|
| Polyunsaturated fatty acids | 6.0 g/100 g product |
| Monounsaturated fatty acids | 11.4 g/100 g product |
| Saturated fatty acids | 2.6 g/100 g product |
| Trans fatty acids | 0.1 g/100 g product |

EXAMPLE 9
Production of a 50% Fat Spread with Stanol Ester

The composition of the fat blend used was as follows: wood stanol fatty acid esters with fatty acids derived from rapeseed oil 30 weight-%, rapeseed oil 58.5 weight-%, and an interesterified blend of palm stearine and coconut oil 11.5%. The blend was prepared by mixing the melted deodorized wood stanol fatty acid ester with rapeseed oil and the hardstock component. The spread was produced on a Gerstenberg & Agger 3×57 pilot scale perfector, with a capacity of 45 kg/h. The product was produced according to the following recipe:

| | |
|---|---|
| Fat blend including the stanol fatty acid esters | 50.0% |
| Water | 49.0% |
| Salt | 0.5% |
| Emulsifiers | 0.4% |
| Flavors | |
| Potassium sorbate | |
| Sodium bicarbonate and citric acid as pH-regulating agent | 0.05% total |
| β-carotene as coloring agent | |

The obtained spread was packed into 250 g polypropene tubs, which were sealed by an aluminum foil. The appearance of the product was equal to conventional 50% spreads. No loose water or oiling out was observed and the spreadability was good. The taste was similar to a commercial product without stanol esters and mouthfeel was good.

The product contains about 41% of absorbable fat with the following fatty acid composition:

| | |
|---|---|
| Polyunsaturated fatty acids | 10.0 g/100 g product |
| Monounsaturated fatty acids | 22.6 g/100 g product |
| Saturated fatty acids | 6.0 g/100 g product |
| Trans fatty acids | 0.3 g/100 g product |

EXAMPLE 10
Production of a 40% Fat Spread with a High Level of Dietary Fiber and with Stanol Ester as Texturizing Agent The fat blend used was prepared by blending 38 weight-% of a melted deodorized wood stanol fatty acid ester with fatty acids derived from rapeseed oil and 62% liquid rapeseed oil. The spread was produced on a Gerstenberg & Agger 3×57 pilot scale perfecter. The capacity used was 45 kg/h. The stanol content of the product was targeted to be about 8.5 g/100 g product, which would provide a daily intake of about 2.1 g stanols at a usage level of 25 g spread/day. The product was produced according to the following recipe:

| | |
|---|---|
| Fat blend including the stanol fatty acid esters | 40.0% |
| Water | 54.0% |
| Raftline HP ® (oligofructose*) | 5.0% |
| Salt | 0.5% |
| Emulsifiers | 0.3% |
| Flavors<br>Potassium sorbate<br>Citric acid as pH-regulating agent<br>β-carotene as coloring agent | 0.05% total |

*Food ingredient of Orafti s.a. Belgium

The obtained spread was packed into 250 g polypropene tubs, which were sealed by an aluminum foil. The appearance of the product was equal to conventional margarines, but the surface was glossy, which is usual in low fat spreads. No loose water or oiling out was observed and the hardness was similar to commercial 40% spreads. The spreadability was excellent and no water appeared on spreading. The mouthfeel was moderate most probably due to the high content of fiber in the product.

The product contains about 31% of absorbable fat with the following fatty acid composition:

| | |
|---|---|
| Polyunsaturated fatty acids | 9.8 g/100 g product |
| Monounsaturated fatty acids | 17.4 g/100 g product |
| Saturated fatty acids | 2.0 g/100 g product |
| Trans fatty acids | 0.2 g/100 g product |

Summary of the Benefits of Fat Blends According to the Invention

It is obvious from a reading of the foregoing discussion that the present invention yields one or more distinct advantages over the use of fatty components rich in saturated or trans-unsaturated fatty acids. In the first place, the substitution of a portion of the harmful fatty acids with unsaturated absorbable fatty acid esters of stanols and sterols blended with liquid vegetable oils rich in unsaturated fatty acids provides a definite nutritional advantage to the user. Furthermore, less than 40% comprises absorbable fatty acids while the sterol is unabsorbed, and thus contributing no calories to the diet. Further, it is noted that the sterol or stanol esters serve to block the absorption of both biliary and endogenic cholesterol into the blood serum. Yet another advantage is that the absorbable fat in the solid fat component can comprise a high percentage of unsaturated fatty acids and a low percentage of harmful saturated and trans fatty acids. Where the entire hardstock is replaced by the texturizing agent the highest reduction in absorbable fat is achieved resulting in a marked decrease of the harmful saturated and trans-unsaturated fatty acids with an improved fatty acid composition high in desirable unsaturated fatty acids.

To clarify the different advantages attained by the present invention compositions of prior art fat blends and fat blends according to the invention are summarized in Table V.

TABLE V

The composition of fat blends, the amount of fatty acids derived from liquid vegetable oils (in weight-%) and the calculated ratio of texturizing agent per solid fat component.

| | liquid oil component | conventional hardstock | sitostanol ester or other texturizing agent | fatty acids derived from liquid vegetable oils | texturizing agent/ solid fat component |
|---|---|---|---|---|---|
| conventional fat blend for margarine | 60 | 40 | — | 57.0 | 0 |
| Example 5 of U.S. Pat. No. 5,502,045 | 48 | 32 | 20 | 53.6 | 0.38 |
| present invention example 5 | 65 | — | 35 | 75.8 | 1 |
| | 70 | — | 30 | 78.5 | 1 |
| | 75 | — | 25 | 81.2 | 1 |
| | 62 | 3 | 35 | 72.9 | 0.92 |
| | 66 | 5 | 29 | 74.3 | 0.85 |
| | 60 | 11 | 29 | 68.6 | 0.72 |
| | 57 | 14 | 29 | 65.8 | 0.67 |
| | 54 | 17 | 29 | 62.9 | 0.63 |
| | 60 | 15 | 25 | 67.0 | 0.62 |
| | 60 | 20 | 20 | 65.0 | 0.50 |
| | 60 | 24 | 16 | 63.4 | 0.40 |
| | 63 | 22 | 15 | 65.8 | 0.40 |
| example 6 | 65 | — | 35 | 75.8 | 1 |
| example 7 | 60 | 7 | 33 | 70.2 | 0.82 |
| example 8 | 59.7 | 7 | 33.3 | 70.0 | 0.72 |
| example 9 | 58.5 | 11.5 | 30 | 67.6 | 0.72 |
| example 10 | 62 | — | 38 | 74.1 | 1 |

From the data shown in Table V it is obvious that the amount of conventional hardstock is substantially reduced in blends according to the invention. The amount of liquid oil can be kept at about the same level or even be increased in relation to amounts in conventional fat blends. When comparing to Example 5 of the prior U.S. Pat. No. 5,502,045 the difference in both the amount of liquid oil and conventional hardstock is significant. It is also obvious that the fat blend disclosed in Example 5 of the prior U.S. Patent has a virtually unchanged composition of fatty acids compared to the conventional fat blend, whereas the fat blends according to the invention show more nutritionally desirable values.

All the above mentioned advantages can be achieved by using the solid fat component disclosed in the present specification without loss of texture of the fat blend or of food products containing the fat blend.

What is claimed is:

1. In a fat blend comprising a liquid oil and a solid fat comprising a hardstock, the improvement comprising at least one phtosterol fatty acid ester as a substitute for at least a portion of the hardstock, wherein said at least one phytosterol fatty acid ester reduce the ratio of hardstock to liquid oil in the fat blend while maintaining the texture of the fat blend, and is present in said solid fat in an amount of at least 60 weight-%.

2. The improved fat blend of claim 1, wherein said solid fat comprises a blend of said at least one phytosterol fatty acid ester and a hardstock.

3. The improvd fat blend of claim 2, wherein said hardstock is present in said solid fat in an amount of at most 15 weight-%.

4. The improved fat blend of claim 3, wherein said at least one phytosterol fatty acid ester comprises at least 70 weight-% of at least one stanol fatty acid ester.

5. A food composition, comprising a nutritional substance and the improved fat blend of claim 2.

6. The improved fat blend of claim 2, wherein said at least one phytosterol fatty acid ester comprises at least one stanol fatty acid ester.

7. The improved fat blend of claim 2, wherein said at least one phytosterol fatty acid ester comprises up to 10 weight-% of at least one sterol fatty acid ester.

8. The improved fat blend of claim 2, wherein said at least one phytosterol fatty acid ester comprises up to 30 weight-% of at least one sterol fatty acid ester.

9. The improved fat blend of claim 2, wherein said at least one phytosterol fatty acid ester comprises up to about 90–95 weight-% of at least one sterol fatty acid ester.

10. The improved fat blend of claim 2, wherein said at least one phytosterol fatty acid ester is prepared using fatty acids dervived from at least one vegetable oil.

11. The improved fat blend of claim 2, wherein said at least one phytosterol fatty acid ester has between 12 and 24 carbon atoms in the fatty acid chain.

12. The improved fat blend of claim 1, wherein said at least one phytosterol fatty acid ester is present in said solid fat in an amount of at least 70 weight-%.

13. The improved fat blend of claim 1, wherein said improved fat blend contains no hardstock, and wherein said at least one phytosterol fatty acid ester is present in said improved fat blend in an amount of at least 25 weight-%.

14. A food composition, comprising a nutritional substance and the improved fat blend of claim 13.

15. The improved fat blend of claim 13, wherein said improved fat blend contains at least 30 weight-% of said at least one phytosterol fatty acid ester.

16. The improved fat blend of claim 15, wherein said at least one phytosterol fatty acid ester comprises at least 70 weight-% of at least one stanol fatty acid ester.

17. The improved fat blend of claim 13, wherein said at least one phytosterol fatty acid ester comprises at least 70 weight-% of at least one stanol fatty acid ester.

18. The improved fat blend of claim 13, wherein said at least one phytosterol fatty acid ester comprises at least one stanol fatty acid ester.

19. The improved fat blend of claim 13, wherein said at least one phytosterol fatty acid ester comprises up to 10 weight-% of at least one sterol fatty acid ester.

20. The improved fat blend of claim 13, wherein said at least one phytosterol fatty acid ester comprises up to 30 weight-% of at least one sterol fatty acid ester.

21. The improved fat blend of claim 13, wherein said at least one phytosterol fatty acid ester comprises up to about 90–95 weight-% of at least one sterol fatty acid ester.

22. The improved fat blend of claim 13, wherein said at least one phytosterol fatty acid ester is prepared using fatty acid derived from at least one vegetable oil.

23. The improved fat blend of claim 13, wherein said at least one phytosterol fatty acid ester has between 12 and 24 carbon atoms in the fatty acid chain.

24. The improved fat blend of claim 1, wherein said at least one phytosterol fatty acid ester is present in said improved fat blend in an amount of at least 15 weight-%.

25. The improved fat blend of claim 1, wherein said at least one phytosterol fatty acid ester is present in said improved fat blend in an amount of at least 30 weight-%.

26. The improved fat blend of claim 25, wherein said at least one phytosterol fatty acid ester comprises at least 70 weight-% of at least one stanol fatty acid ester.

27. A food composition, comprising a nutritional substance and the improved fat blend of claim 1.

28. The improved fat blend of claim 1, wherein said at least one phytosterol fatty acid ester comprises at least one stanol fatty acid ester.

29. The improved fat blend claim 1, wherein said at least one phytolsterol fatty acid ester comprises up to 10 weight-% of at least one sterol fatty acid ester.

30. The improved fat blend of claim 29, wherein said at least one phytosterol fatty acid ester comprises at least one stanol fatty acid ester.

31. The improved fat blend of claim 30, wherein said at least one phytosterol fatty acid ester comprises at least 70 weight-% of at least one stanol fatty acid ester.

32. The improved fat blend of claim 1, wherein said at least one phytosterol fatty acid ester comprises up to 30 weight-% of at least one sterol fatty acid ester.

33. The improved fat blend of claim 32, wherein said at least one phytosterol fatty acid ester comprises at least one stanol fatty acid ester.

34. The improved fat blend of claim 33, wherein said at least one phytosterol fatty acid ester comprises at least 70 weight-% of at least one stanol fatty acid ester.

35. The improved fat blend of claim 1, wherein said at least one phytosterol fatty acid ester comprises up to about 90–95 weight-% of at least one sterol fatty acid ester.

36. The improved fat blend of claim 35, wherein said at least one phytosterol fatty acid ester comprises at least one stanol fatty acid ester.

37. The improved fat blend of claim 1, wherein said at least one phytosterol fatty acid ester comprises up to 100 weight-% of at least one sterol fatty acid ester.

38. The improved fat blend of claim 37, wherein said at least one phytosterol fatty acid ester comprises at least one stanol fatty acid ester.

39. The improved fat blend of claim 1, wherein said at least one phytosterol fatty acid ester is prepared using fatty acid derived from at least one vegetable oil.

40. The improved fat blend of claim 39, wherein said at least one vegetable oil is selected from the group consisting of rapeseed oil, coconut oil, palm oil, partially hydrogenated vegetable oil, sunflower oil, soybean oil and corn oil.

41. The improved fat blend of claim 1, wherein said at least one phytosterol fatty acid ester has between 4 and 24 carbon atoms in the fatty acid chain.

42. The improved fat blend of claim 1, wherein said at least one phytosterol fatty acid ester has between 12 and 24 carbon atoms in the fatty acid chain.

43. The improved fat blend of claim 1, wherein said at least one phytosterol fatty acid ester has between 16 and 20 carbon atoms in the fatty acid chain.

44. The improved fat blend of claim 1, wherein said improved fat blend comprises about 15–38 weight-% of a wood and/or vegetable oil stanol ester, about 54–75 weight-% of rapeseed oil and about 0–17 weight-% of a hardstock.

45. The improved fat blend of claim 1, wherein said improved fat blend comprises about 29–35 weight-% of stanol ester, about 54–75 weight-% of rapeseed oil and about 3–17 weight-% of a hardstock.

46. The improved fat blend of claim 1, wherein said at least one phytosterol fatty acid is present in said improved fat blend in an amount of at least 35 weight-%.

47.The improved fat blend of claim 1, wherein said at least 60 weight-% of the fatty acid in the fat blend, including the liquid oil and the at least one phytosterol fatty acid ester, are derived from vegetable oils.

48. The improved fat blend of claim 1, wherein said at least one phytosterol fatty acid ester comprises at least 70 weight-% of at least one stanol fatty acid ester.

49. The improved fat blend of claim 1, wherein said phytosterol comprises a polycyclic steriod nucleus comprising a 17 carbon atom ring system, a said chain and a hydroxyl group.

* * * * *